US010380600B2

(12) United States Patent
Bedoun et al.

(10) Patent No.: US 10,380,600 B2
(45) Date of Patent: Aug. 13, 2019

(54) PROGRAM IDENTIFIER RESPONSE TO UNSTRUCTURED INPUT

(71) Applicant: INTERNATIONAL BUSINESS MACHINES CORPORATION, Armonk, NY (US)

(72) Inventors: Joe Bedoun, Carol Stream, IL (US); Tommy Blankenship, Nevada, OH (US); Brian Byrne, Batavia, IL (US); Nick J. Cerciello, McKinney, TX (US); Liz G. Edelson, Delray Beach, FL (US); Morad El Akbani, Bridgewater, NJ (US); Donna Griff, Stanhope, NJ (US); Robert M. Lambert, North Plainfield, NJ (US); Shawn D. Mohr, Rochester, MN (US); Stacy Newsome, Bridgewater, NJ (US); Dennis A. Perpetua, Jr., Jay, NY (US); David M. Reynolds, Greenville, WI (US); Gary Woodward, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 15/450,116

(22) Filed: Mar. 6, 2017

(65) Prior Publication Data
US 2018/0253735 A1 Sep. 6, 2018

(51) Int. Cl.
G06F 16/35 (2019.01)
G06Q 30/00 (2012.01)
G06N 7/00 (2006.01)
G06F 17/27 (2006.01)
G06N 20/00 (2019.01)

(52) U.S. Cl.
CPC .......... *G06Q 30/016* (2013.01); *G06F 16/35* (2019.01); *G06F 17/273* (2013.01); *G06F 17/274* (2013.01); *G06F 17/2705* (2013.01); *G06F 17/278* (2013.01); *G06F 17/2785* (2013.01); *G06N 7/005* (2013.01); *G06N 20/00* (2019.01)

(58) Field of Classification Search
CPC ...................................................... G06F 17/27
USPC ........................................................ 714/26
See application file for complete search history.

(56) References Cited

U.S. PATENT DOCUMENTS 6,829,734 B1 * 12/2004 Kreulen ................ G06Q 30/02
                                              379/9.02
7,599,952 B2    10/2009 Parkinson
2008/0201279 A1 *  8/2008 Kar ..................... G06F 17/2705
                                              706/12

(Continued)

OTHER PUBLICATIONS

Peter Mell et al, The NIST Definition of Cloud Computing, National Institute of Standards and Technology, Publication 800-145, 2011.

*Primary Examiner* — Kamini B Patel
(74) *Attorney, Agent, or Firm* — Patrick J. Daugherty; Daugherty & Del Zoppo Co., LPA

(57) ABSTRACT

A computer-implemented method for identifying a problem from unstructured input includes executing on a computer processor the step of identifying context of a problem description from a service support k ticket which adds one or more tags to the service support ticket, each tag corresponding to an end-user symptom within the problem domain. Intent is mapped according to a machine learning model and the one or more tags which identifies a problem and a confidence measure.

14 Claims, 4 Drawing Sheets

(56) References Cited

U.S. PATENT DOCUMENTS

| | | | |
|---|---|---|---|
| 2014/0006861 A1* | 1/2014 | Jain | G06Q 30/01 |
| | | | 714/26 |
| 2014/0325254 A1* | 10/2014 | Mani | G06F 11/0793 |
| | | | 714/2 |
| 2016/0110723 A1* | 4/2016 | Shimpi | G06Q 30/016 |
| | | | 705/304 |
| 2016/0196501 A1* | 7/2016 | Anand | G06Q 10/0635 |
| | | | 706/46 |

* cited by examiner

PROGRAM IDENTIFIER RESPONSE TO UNSTRUCTURED INPUT

BACKGROUND

Problem reporting systems or service management systems receive problems entered by support professionals into the service management system or messages sent directly from computing systems experiencing a problem to the service management system.

In response to the received problem, the service management system generates a ticket, which is used to track the problem. Each ticket includes data fields, which include unstructured or structured content. For example, a person's name or identifier of a computing system reporting the problem is recorded in a structured field identifying a source of the reported problem. Tickets generated in response to received machine messages, such as self-diagnosing computer systems, include structured data that is readily interpretable. For example, a security server sends an email message to the ticket system with structured content the security server is experiencing high central processing unit (CPU) utilization.

Problem descriptions entered by support professionals include unstructured data input, such as a string of alphanumeric text. Examples of problem descriptions include "My email is down," "I can't access the Internet," "My browser doesn't work," and "I forgot my password." The unstructured problem description is not a precise statement of the actual problem. Rather the unstructured problem description includes statements of symptoms or environmental impacts that are used by the ticket management systems and/or system professionals to understand what the user is experiencing, identify an actual problem and offer possible solutions.

BRIEF SUMMARY

In one aspect of the present invention, a computer-implemented method for identifying a problem from unstructured input includes executing on a computer processor the step of identifying context of a problem description from a support ticket which adds one or more tags to the support ticket, each tag corresponding to an end-user symptom within the problem domain. Intent is mapped according to a machine learning model and the one or more tags which identifies a problem and a confidence measure.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby identify context of a problem description from a support ticket which adds one or more tags to the support ticket, each tag corresponding to an end-user symptom within the problem domain. Intent is mapped according to a machine learning model and the one or more tags which identifies a problem and a confidence measure.

In another aspect, a computer program product for identifying a problem from unstructured input has a computer-readable storage medium with computer readable program code embodied therewith. The computer readable hardware medium is not a transitory signal per se. The computer readable program code includes instructions for execution by a processor that cause the processor to identify context of a problem description from a support ticket which adds one or more tags to the support ticket, each tag corresponding to an end-user symptom within the problem domain. Intent is mapped according to a machine learning model and the one or more tags which identifies a problem and a confidence measure.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
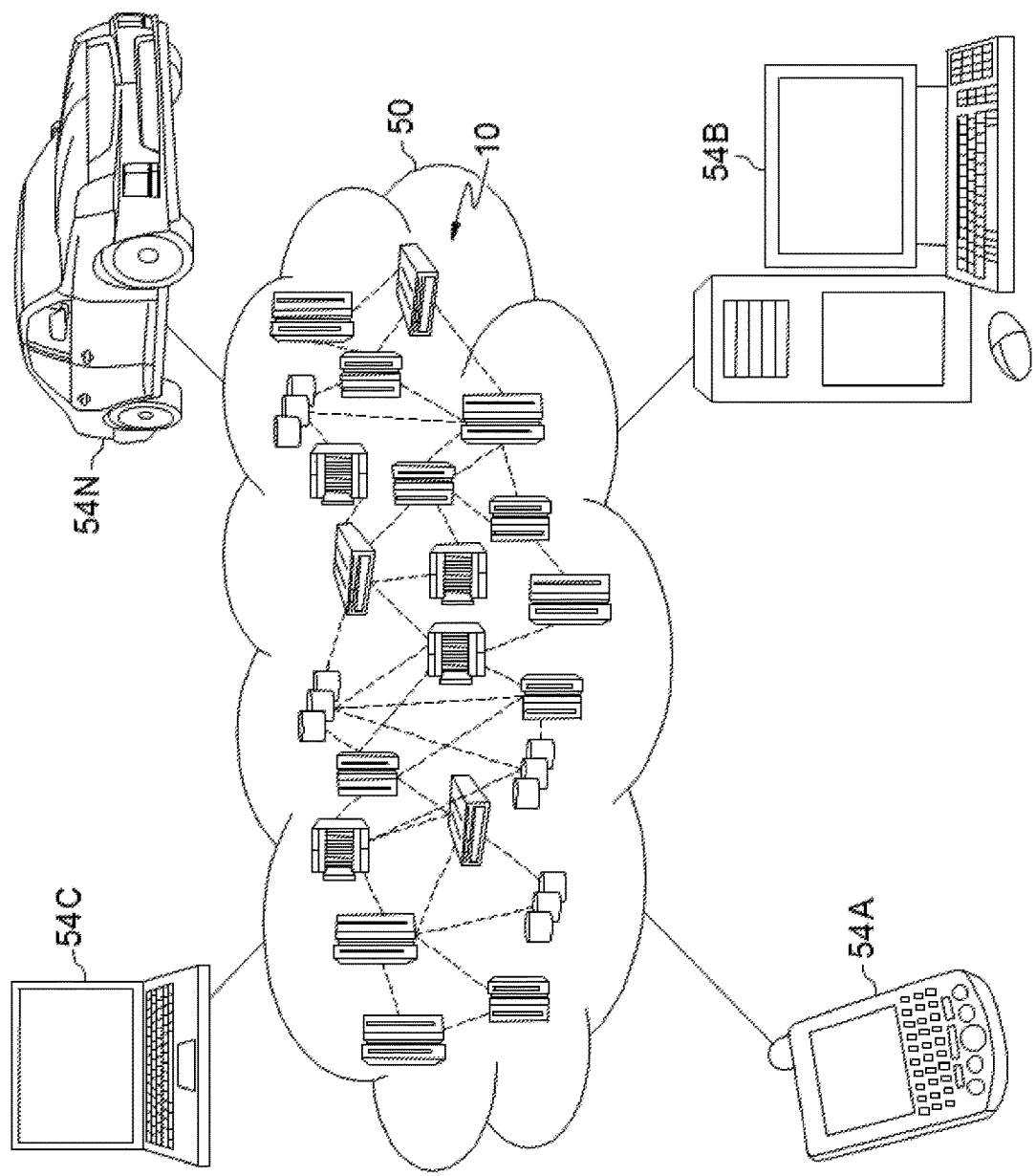
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
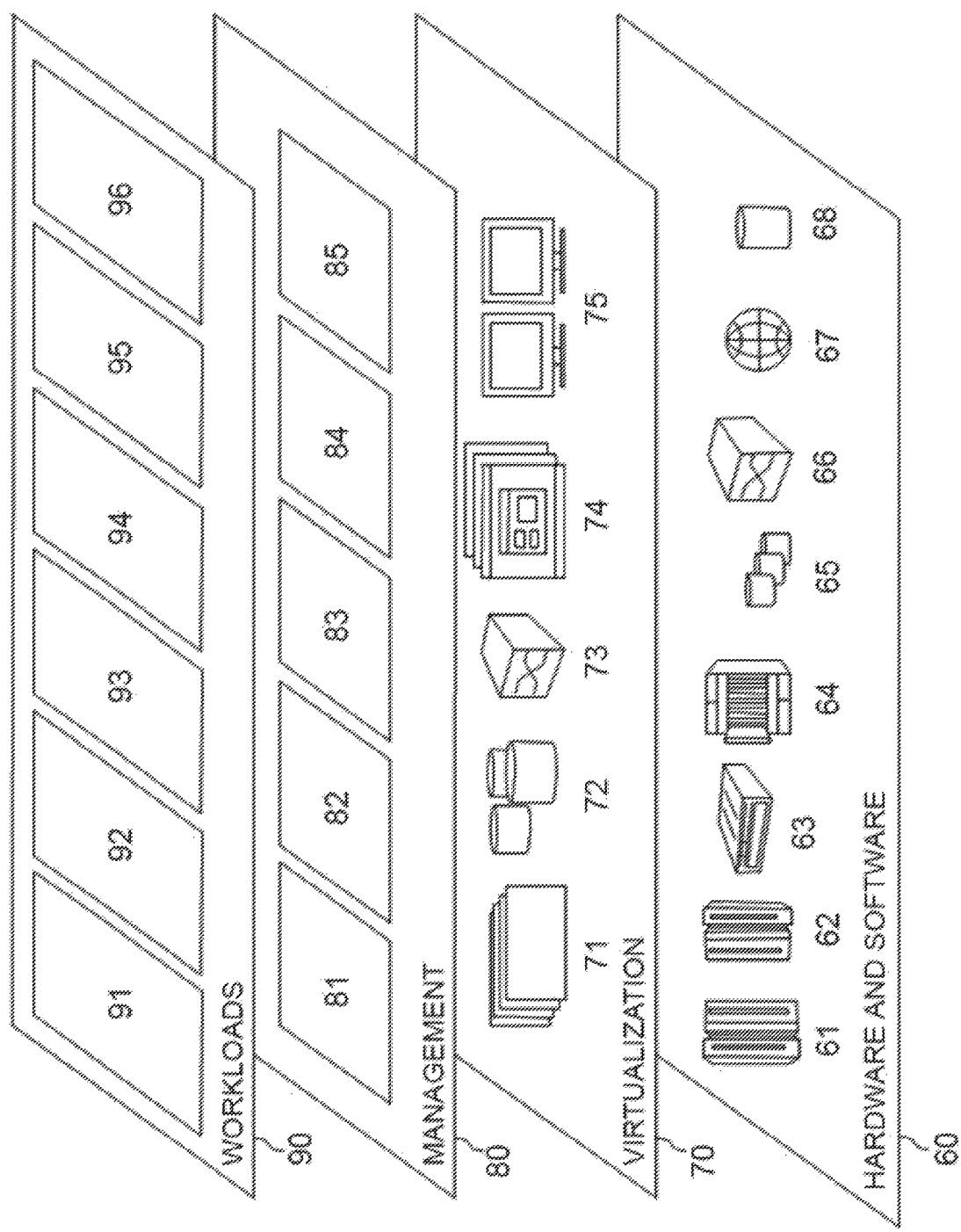
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for identifying a problem from unstructured input 96.

Figure 3:
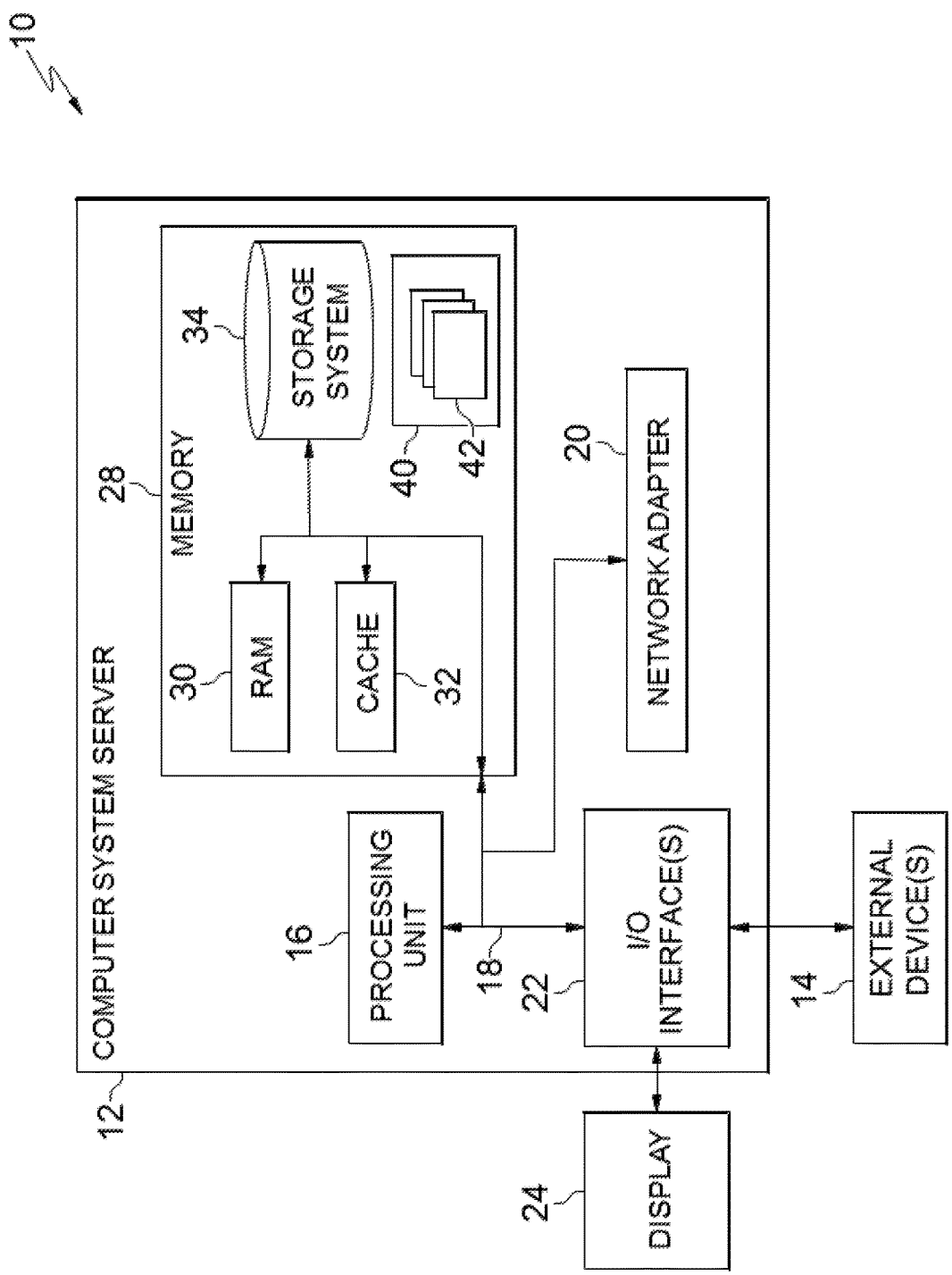
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
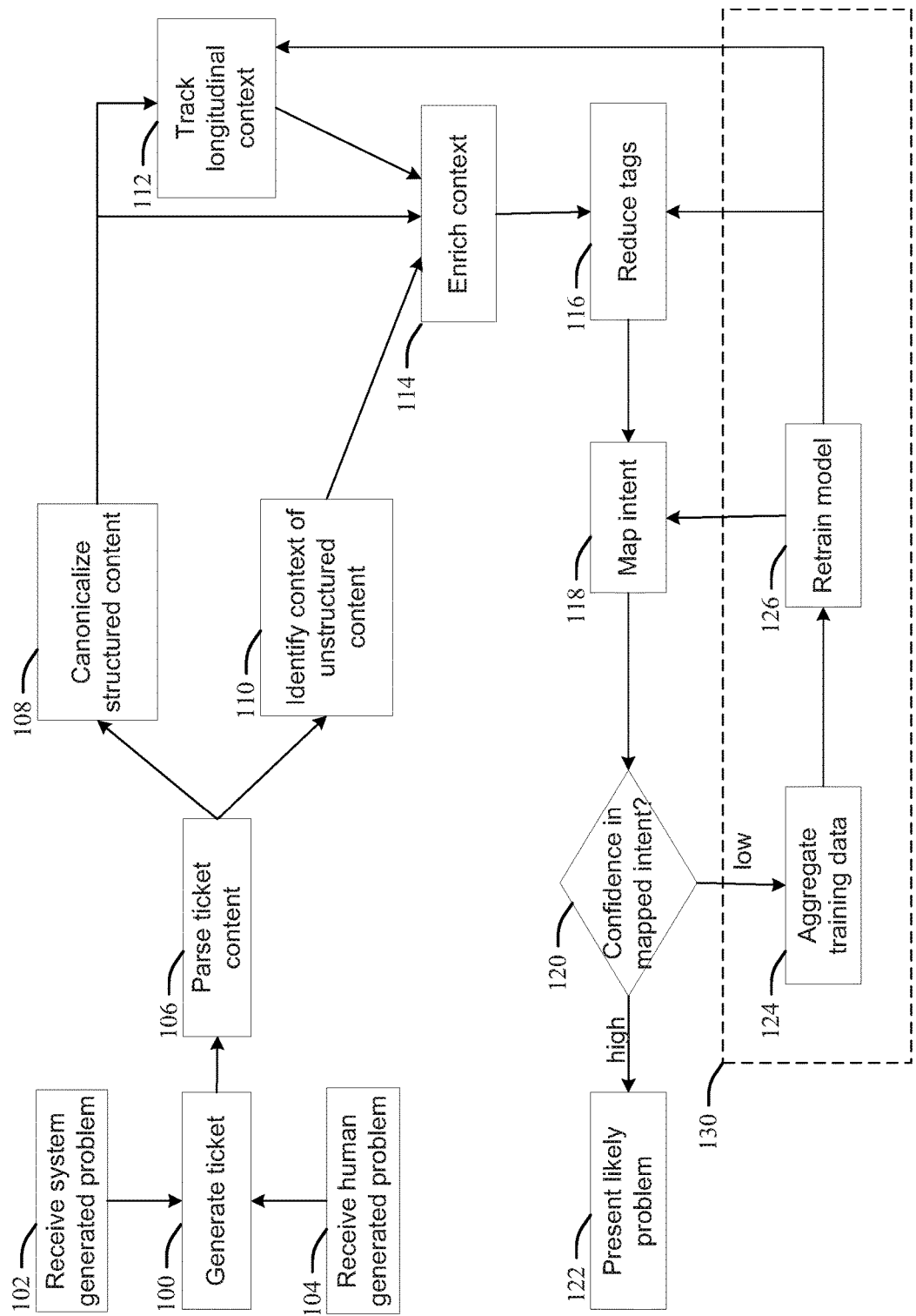
FIG. 4 is a flow chart illustration of an embodiment of the present invention.

FIG. 4 illustrates a process or system according to the present invention for identifying problem solutions cognitively from unstructured input. At 100, a processor that is configured according to an aspect of the present invention (the "configured processor") generates a ticket in response to a received reported problem. The reported problem can be received via electronic communication from a computing device at 102, such as one of the cloud computing nodes 10. The reported problem can be received by human entry at 104, such as entry by a help desk professional into a receiving screen or page of the system based on data communicated via voice communication with a consumer, an email received from an end user, a text message received from an end user, and the like. The configured processor may be implemented in accordance with the computer system server 10 of FIG. 3, including as the cloud node 10 of FIG. 1, as described respectively above.

At 106 the configured processor parses the ticket into structured and unstructured content. Structured content includes source identification, such as a name of a person reporting the problem, a system identifier, a hardware component of a system, a software component of a system, a node identifier, a network address, and the like. The structured content can include the manner of receiving, such as entry by service support professional, an end user web based entry, an electronically received email message, and the like. The structured content can include a location of the reported problem, such as a physical address, building name, and the like. The structured content can include problem data reported from a cloud node 10. For example, an email server "MAILSRV01" sends an alert of "HIGH CPU". The unstructured content includes a problem description from human generated ticket.

At 108, the configured processor canonicalizes the structured content. For example, entry of a structured person's name reporting the problem or problem source can be canonicalized as last name, first name. Canonicalization standardizes the presentation of the structured content. The canonicalization can include verification or validation of the content according to a database. For example, a person's name can be presented as represented in a repository of persons associated with the cloud 50 or the local computing devices 54, such as a human resources database. The canonicalization includes identifying entities associated with the structured content, such as the cloud 50, one or more nodes 10 of the cloud 50, the local computing device(s) 54, components of the local computing device 54, hardware and software 60, virtualization 70, management 80, workloads 90, or combinations thereof.

The canonicalization includes identification of a problem domain. A problem domain is a collection of the entities and associated problems. The problem domain can be represented as a graph with entities as graph nodes and edges between the graph nodes indicating dependencies between the graph nodes. For example, email access by the local computing device 54 at a location can be represented as graph, where each graph node represents a component used in the access of email message, such as an email server holding the message, security server checking the validity of user accessing the message, network components transporting the message, laptop connectivity receiving the transported message, email program on the laptop formatting and displaying the message, and the like. Graph nodes can be used in linked layers, such as illustrated with respect to FIG. 2. For example, "accessing email" can be represented as a graph node representing a component of the workload layer 90. The graph node can be linked to lower layers, such one server 63 in the hardware and software layer 60, which comprise the hardware and software entities that provide the access to the email. Problems can be associated with each graph node as a set of attributes of the node.

The canonicalization includes identifying possible problem domains corresponding to the entities. In other words, by identification of entities, a scope of the problem domain is set according to the structured content.

At 110, the configured processor identifies a context of the unstructured content, such as the problem description. Identifying the context can include a cleaning of the unstructured content, and a semantic analysis of the cleaned content, which identifies cognitive elements. Cleaning the content includes correcting misspellings and grammatical errors. For example, in the problem description of "cant accss emal," is corrected to "cannot access e-mail". Data cleaning can include mapping of product names to a common name using a lexicon. For example, reported problems can include different diminutions of product names used in common speech, which can be mapped to actual product names.

The semantic analysis can use stemming of words and parts of speech to identify the cognitive elements according to the cleaned data. For example, in the problem description of "email not loading", a root of the word "loading" is "load". Stems of "load" include "loading", "loaded", "loads" and the like. The semantic analysis can include grouping of contextual inflections. For example, "My email is down" and "My email is not responding" are grouped contextual inflections.

The cognitive elements indicate an intent, such as a subject-predicate pairs. The subject-predicate pairs include a noun, a noun phrase, and the like. The subject-predicate pairs include a verb, a verb phrase, a predicate, and the like. For example, in a reported problem of "can't access email", the intent is expressed as "cannot access", a predicate, to "email", a noun. The noun indicates the entity or can be mapped to the entity. For example, "ID" is a user identifier, which is maintained by a security server and can be mapped to the security server. The verb indicates a symptom associated with the one or more entities, which can be mapped to a symptom or problem associated with the one or more entities.

The context of the unstructured content is represented as one or more tags added according to a set of rules. For example, "My email is down", "My email is not responding" and "I can't get email" adds a tag of "email_unavailable" to the ticket according to a rule(s). The tag indicates the entity and associated symptom and/or problem. Tags are added using a set of rules for the problem domain according to the semantic analysis of the cleaned data.

At 112, the configured processor tracks longitudinal context by keeping a running tally of problems by entity, which define a problem domain for the entity. The longitudinal tracking can include a tally of reported problems by entity or a tally of problems by problem domains associated with each entity. The tallies can be updated according to the canonicalized structured data of the tickets. For example, with a simplified set of problems: laptop_connectivity_problem, network_outage, email_server_down, locked_id, running ticket tallies of 2, 8, 19, 64, are respectively recorded for entities representing a local computing device 54, and cloud nodes 10 of a network, an email server and a security server.

At 114, the configured processor enriches the context of the unstructured content by adding additional tags using a set of rules. For example, a source, "Smythe, Sam", reports "cannot access e-mail". The canonicalized source is associated with a laptop local computing device. Using the rules, other problem domains associated with "cannot access email" are identified connected to the laptop local computing device, such as network components, the email server hardware, and the like. Continuing the simplified example above, highly ranked problems according to the tallies: "locked_id" and "network_outage" are added as corresponding to a component of the security server. That is, additional tags, which represent possible environmental overlap and/or common end user symptoms from other tickets are added as additional tags.

An advantage of longitudinal tracking includes consideration of current problems across the cloud 50, which is distinguished from other approaches that use only information according to an individual problem ticket to identify a likely root cause. For example, in "cannot access" "email", a user problem considering only that of a single user is likely to be one of network accessibility, such as wireless connectivity, disconnected cable, parameter setting, password problem, and the like. However, in the event of a high tally of email problems associated with the entity of an email server for many tickets, the user problem is more likely a problem with the email server. In the event of a high tally of security problems, such as with a security server used by the email server, the user problem is more likely the security server. The running tallies provide the advantage of adapting to changes in the current problem environment.

At 116, the configured processor can reduce the tags using rules. The rules implement a coarse grained filter, which uses weighting and/or grouping to eliminate tags. For example, each of the tags can be added with a weight representing a likelihood that the problem is the root cause. The filter can eliminate tags with weights that do not meet a predetermined threshold. The filter can eliminate tags for represented by a grouping. For example, a user reports a problem with accessing network based office spreadsheet tool. The spreadsheet tool is part of an office product suite that also includes a word processing tool, an email tool, a presentation tool and the like. Tags include the product suite and the individual tools within the suite. Rules eliminate the tags of individual tools, keeping the tag representing the product suite.

At 118, the configured processor maps the intent using a machine learning model to identify the problem. The machine learning model is constructed using deep learning techniques. The training corpus for the machine learning model uses previously resolved tickets and corresponding tags. The machine learning model processes the tags and additional tags to identify a problem. The identified problem is expressed as one or more tags, each with a confidence score. For example, in a set of tags: "email_inaccessible," "locked_id," "network_outage," "email_server_down" corresponding confidence scores of 0.01, 0.45, 0.80, and 0.08 are returned.

At 120, the configured processor examines the confidence levels in the mapped intent.

At 122, the configured processor, in response to a high confidence level, presents the mapped intent. For example, with a confidence score of 0.80 for a mapped intent of network_outage, a network outage is presented as the likely problem, such as message on a display screen to the support professional. The mapped intent can include corresponding possible solutions, according to a mapping stored in a computer memory, such as a database. For example, the network outage may correspond to a wireless network, and possible solutions include connecting to a wired network or a different wireless network.

At 124, the configured processor, in response to low confidence levels, stores the service support ticket and tags in a database. The database aggregates the low confidence service support tickets and corresponding tags as re-training data. The aggregated training data can include a review and identification of an actual problem for tickets. The review can include identification of new entities, symptoms and/or problems.

At 126, the configured processor re-trains the machine learning model for mapping intent using training data or corpus that includes the reviewed aggregated training data. The updated learning model can change the weighting given to tags in reducing the tags. The updated learning model can be used to change or reset the longitudinally tracked entities. The updated learning model can identify new rules for identifying context and/or enriching context.

Acts 102 through 122 represent an application cycle of the system.

Acts 124 and 126 represent a learning cycle, which periodically re-trains the machine learning model.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:
    parsing a service support ticket into structured and unstructured content, wherein the unstructured content comprises a problem description;
    identifying an entity and a problem domain within the structured content; adding one or more tags to the service support ticket in response to identifying a context of the problem description, wherein each of the added one or more tags corresponds to a different end-user symptom within the problem domain;
    tracking problems longitudinally by entity to thereby tally occurrences of problems that are mapped to the different end-user symptoms and associated with the identified entity within a plurality of generated service support tickets; and
    identifying the mapped problem having a highest tally of occurrences associated with the identified entity as a likely root cause of the service support ticket.

2. The method of claim 1, further comprising:
    integrating computer-readable program code into a computer system comprising a processor, a computer readable memory in circuit communication with the processor, and a computer readable storage medium in circuit communication with the processor; and
    wherein the processor executes program code instructions stored on the computer-readable storage medium via the computer readable memory and thereby performs the steps of parsing the service support ticket into structured and unstructured content, identifying the entity and the problem domain within the structured content, adding the one or more tags to the service support ticket in response to identifying the context of the problem description, tracking the problems longitudinally by entity to thereby tally occurrences of problems that are mapped to the different end-user symptoms and associated with the identified entity within the plurality of generated service support tickets, and identifying the mapped problem having the highest tally of occurrences associated with the identified entity as the likely root cause of the service support ticket.

3. The method of claim 2, wherein the computer-readable program code is provided as a service in a cloud environment.

4. The computer-implemented method of claim 1, further comprising:

identifying the context of the problem description as a function of cleaning the problem description and applying semantic analysis to the cleaned problem description.

5. The computer-implemented method of claim 1, further comprising:
determining a confidence measure for identifying the mapped problem having the highest tally of occurrences associated with the identified entity as the likely root cause according to a machine learning model.

6. The computer-implemented method of claim 5, further comprising:
training the machine learning model on a training corpus that includes the one or more tags added to the service support ticket and a corresponding problem of previously resolved service support tickets.

7. A system for identifying a problem from unstructured input, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
parses a service support ticket into structured and unstructured content, wherein the unstructured content comprises a problem description;
identifies an entity and a problem domain within the structured content;
adds one or more tags to the service support ticket in response to identifying a context of the problem description, wherein each of the added one or more tags corresponds to a different end-user symptom within the problem domain;
tracks problems longitudinally by entity to thereby tally occurrences of problems that are mapped to the different end-user symptoms and associated with the identified entity within a plurality of generated service support tickets; and
identifies the mapped problem having a highest tally of occurrences associated with the identified entity as a likely root cause of the service support ticket.

8. The system of claim 7, wherein the processor executes program instructions stored on the computer-readable storage medium via the computer readable memory and thereby:
identifies the context of the problem description as a function of cleaning the problem description and applying semantic analysis to the cleaned problem description.

9. The system of claim 7, wherein the processor executes program instructions stored on the computer-readable storage medium via the computer readable memory and thereby:
determines a confidence measure for identifying the mapped problem having the highest tally of occurrences associated with the identified entity as the likely root cause according to a machine learning model.

10. The system of claim 9, wherein the processor executes program instructions stored on the computer-readable storage medium via the computer readable memory and thereby:
trains the machine learning model on a training corpus that includes the one or more tags added to the service support ticket and a corresponding problem of previously resolved service support tickets.

11. A computer program product, comprising:
a computer readable storage medium having computer readable program code embodied therewith, wherein the computer readable storage medium is not a transitory signal per se, the computer readable program code comprising instructions for execution by a processor that cause the processor to:
parse a service support ticket into structured and unstructured content, wherein the unstructured content comprises a problem description;
identify an entity and a problem domain within the structured content;
add one or more tags to the service support ticket in response to identifying a context of the problem description, wherein each of the added one or more tags corresponds to a different end-user symptom within the problem domain;
track problems longitudinally by entity to thereby tally occurrences of problems that are mapped to the different end-user symptoms and associated with the identified entity within a plurality of generated service support tickets; and
identify the mapped problem having a highest tally of occurrences associated with the identified entity as a likely root cause of the service support ticket.

12. The computer program product of claim 11, wherein the instructions for execution cause the processor to:
identify the context of the problem description as a function of cleaning the problem description and applying semantic analysis to the cleaned problem description.

13. The computer program product of claim 11, wherein the instructions for execution cause the processor to:
determine a confidence measure for identifying the mapped problem having the highest tally of occurrences associated with the identified entity as the likely root cause according to a machine learning model.

14. The computer program product of claim 13, wherein the instructions for execution cause the processor to:
train the machine learning model on a training corpus that includes the one or more tags added to the service support ticket and a corresponding problem of previously resolved service support tickets.

* * * * *